Oct. 22, 1963  O. LINDSTRÖM  3,107,982
CONTINUOUSLY OPERATING LIQUID-LIQUID EXTRACTION APPARATUS
Filed April 6, 1960
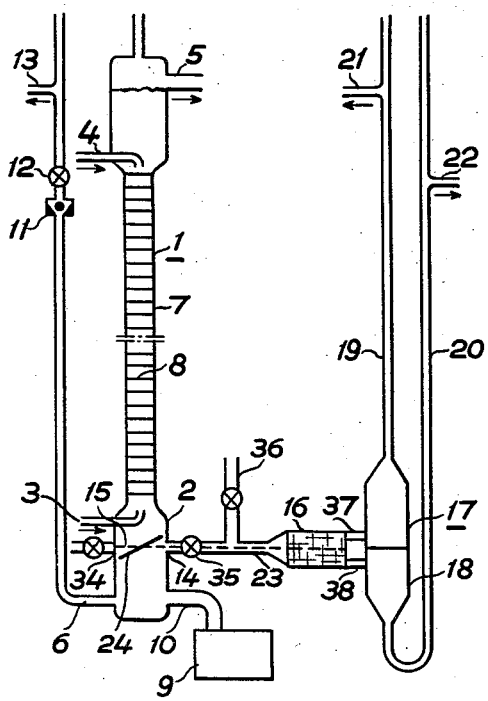
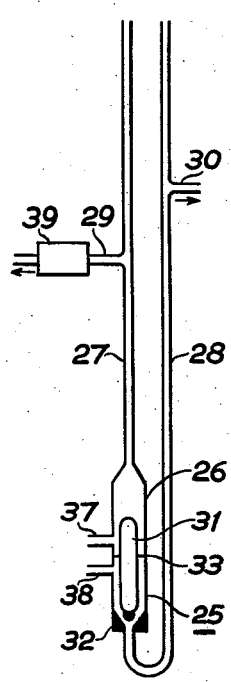
INVENTOR.
Olle Lindström
BY
Bailey, Stephens, & Huettig
ATTORNEYS

United States Patent Office 3,107,982
Patented Oct. 22, 1963

3,107,982
CONTINUOUSLY OPERATING LIQUID-LIQUID
EXTRACTION APPARATUS
Olle Lindström, Vasteras, Sweden, assignor to Allmanna
Svenska Elektriska Aktiebolaget, Vasteras, Sweden
Filed Apr. 6, 1960, Ser. No. 20,306
Claims priority, application Sweden Apr. 15, 1959
9 Claims. (Cl. 23—270.5)

Extraction with organic solvents has recently become of great industrial significance. Accordingly, such processes are used in the petroleum industry and in the nuclear energy industry, among other things, for processing irradiated fuel for the recovery of plutonium, uranium or thorium. The extraction process has had great success in the treatment of nuclear fuel, mainly because of the good separation from the fission products which is possible under favourable conditions. Several different constructions of the apparatus have been proposed for liquid-liquid extraction. Within nuclear energy technique, so called pulsed columns are mainly used. Pulsed columns are usually provided with sieve plates or bottoms of expanded metal. In certain cases, packed columns are used. The contents of the column is subjected to a pulsing movement which is superimposed on the net transport of the two liquid phases moving in countercurrent flow. The pulsing movement is usually brought about with the help of a diaphragm- or plunger-pump connected by means of a branch conduit. The turbulent stirring and the perpetual new formation of liquid drops during the passage through the bottoms under pulsation, has the result that the distribution equilibria are reached quickly, and for this reason, the pulsed columns can be made shorter than the conventional packed columns.

In the practical operation of extraction apparatus, for example pulsed columns, difficulties often appear at the separation of the two phases, particularly with the extraction of radioactive solutions. These columns are usually provided with wider end sections for feeding and separating. In general one works with a continuous water phase and a lighter dispersed organic phase, and separation then occurs in the upper end of the column. Regulation of the operation occurs in such a way that the supply of the heavier component in the upper end of the column, or the outflow of the same at the lower end is adapted so that the position of the interface between the two phases in the top of the column is held at a constant level. Because the outflow of the higher phase usually takes place via overflows, no special regulation is required for this.

For indicating the position of the interface, and regulating the supply and outflow so that the interface is held at a constant level, pneumatic methods are preferably used, but electric level indication may also be used. The equipment required for this control and regulation is complicated, which is a disadvantage, particularly when working with strong radioactive solutions because of the difficulties of maintenance and repair. A serious inconvenience is also the occurrence of dispersed impurities which collect in the interface or transition zone. When the interface is in the top of the column and a heavier continuous phase is being used, for example a water phase, and a lighter dispersed phase, for example an organic liquid phase, the lighter liquid phase, which at an extraction stage contains the purified product, passes through the often highly impure transition zone, whereby undissolved or dispersed radioactive compounds are drawn in with the lighter phase. In practice, this drops the decontamination factors to such a degree that the product specifications cannot be fulfilled. It often happens that such disturbances require shut-down for a longer time for cleaning up the column. A possible way of reducing the effect of the mentioned disturbances, is to position the interface or transition zone in the lower end of the column, whereby a continuous lighter phase is used, for example an organic liquid phase and a dispersed heavier phase, for example, a water phase. The risk of contamination of the product solution because of included radioactive impurities from the transition zone is then less. Indication of the position of the transition zone becomes therefore more difficult. Even with this method of operation, impurities accumulate in the column and it must therefore be shut-down periodically for cleaning up.

Another known principle is to conduct a level regulated interface in the column from the column and remove the impurities in an outer circuit. It is also known to equip extraction columns with a vessel connected to a branch conduit, in which vessel the boundary layer is formed and in which the level regulators are placed. Even if one avoids collecting impurities in the actual column, this known method still has the serious disadvantage that the level regulating devices come into contact with the impurities which, as started earlier, brings about great difficulties in maintenance and repair.

According to the following invention, the use is avoided of level indicating means, for example pneumatic or electric systems, placed in the extraction apparatus, from which impulses regulate the supply or outflow of the heavier phase, and an extremely simple regulation of the operation of the apparatus is obtained. According to the invention, a liquid mixture is drawn off from the apparatus where the transition zone between the liquid phases is situated and is freed from undissolved or dispersed particles, for example by filtration, after which the liquid mixture is led to a device which acts as level regulator for the interface or transition zone in the extraction apparatus. In the level regulating device takes place a division of the liquid mixture into phases, if such a division has not already existed in the extraction apparatus or taken place in connection with the dispersed impurities being removed. The separated liquid phases thus obtained can then, under certain circumstances, be taken back to the extraction apparatus. This level regulating device included in a branch circuit connected to the extraction apparatus where the transition zone is intended to be, functions in such a way that with an excess of heavy phase in the liquid mixture, it increases the outflow of this phase from the device and with a deficit of heavy phase, it decreases the outflow of the same. A rise in the level of the interface or transition zone in the apparatus produces increased proportion of heavy phase in the liquid mixture, and consequently an increase in the outflow of heavy phase from the level regulation device in the branch conduit, which counteracts the rise in the level of the transition zone. In a corresponding way a drop in the level of the transition zone is counteracted by a decrease in the outflow of heavy phase from the device. In order to effect this occurrence in a level regulating device, this may consist of a container which is provided with an open riser for the lighter phase and a second open riser for the heavier phase, both of which risers are provided with outflows placed at an adapted level. The levels for these outflows can be determined mathematically from the hydrostatic and hydrodynamic pressures which prevail in the risers and column, and from the amount of the liquid phases brought to the column and removed from the column respectively in the case in question, but they may also be determined purely by experiment. It is most suitable to make the outflows of the risers adjustable so that in connection with the flows of both the liquid phases through the apparatus being adapted to the desired conditions by adapting the supply and outflow for respective phases, the levels of the outflows of the risers are set so that the transition zone between the phases in the apparatus lies on a level with the branch conduit. Instead of equipping the risers with adjustable outflows, they may have a fixed level and the container may be provided with a valve which regulates the flow of the heavier phase out of the container. The valve can, among other things, consist of a float which tightens against a seat at the outflow of the heavier phase from the container. When the amount of heavier phase in the liquid mixture is increased the float is lifted, which produces an increased outflow of this phase, and when the amount of heavier phase in the liquid mixture is decreased, the float drops, which decreases the outflow of this phase. In order to avoid stagnant light liquid phase, it can be transported through the branch conduit by a pump or other circulation device.

An example of the practical execution of the process will be described more closely in the following with reference to the accompanying figures.

FIGURE 1 shows an embodiment of the device for carrying out the method according to the invention, in which the level regulating device is provided with adjustable outflows for respective liquid phases.

FIGURE 2 shows an embodiment of the regulating device, which comprises a valve which regulates the flow of the respective liquid phases.

In FIGURE 1, the extraction apparatus consists of a pulsed column. The lighter phase is homogeneous and the transition zone consequently lies at the lower end 2 of the column 1. The pulsed column is constructed in a known manner. The organic phase is introduced by the conduit 3, while the heavy phase is introduced at 4. The outflow of the light phase occurs at 5 while the heavy phase leaves mainly at 6. The column part 7 has perforated bottoms 8. The pulsation occurs with the help of the pulsing means 9 which is connected to the lower end of the column via the conduit 10. The feeding out of the heavy phase may, for example, take place with the help of the pulsation in the liquid: a non-return valve 11 prevents the reflux, the regulation of the flow is carried out with the help of the valve 12 and the liquid outflow takes place at 13. A pump can, of course, be used for this purpose, or some other suitable device for regulating the outflow. The cleaning circuit is connected to the lower end of the column at 14 which is in that plane in which the interface 15 is intended to be. The cleaning circuit consists of a filter unit 16 and a level regulating device 17, the object of which is also to distribute the two liquid phases which are led through the filter unit, as will be seen more clearly below. The device 17 consists of a cylindrical vessel 18 with a riser 19 for the lighter phase and a riser 20 for the heavier phase. The risers are provided with outflows 21 and 22 adjustable vertically. The outflows are set at such a level that the phases reach the outflow level when the transition zone 15 in the column is on a level with the connection 14 or the branch conduit 23. At the level at which the branch conduit is connected, the column is equipped with a guiding screen 24 which conducts the impurities from the transition zone towards the branch conduit.

In FIGURE 2 is seen another embodiment of the regulating device 25. It consists of a container 26 with a riser 27 for the lighter phase and a riser 28 for the heavier phase, which are provided with outlets 29 and 30. The container, further, contains a float 31 which tightens against the seat 32. This float has such a weight and buoyancy that its position is dependent upon the position of the interface or transition zone 33 in the level regulating device 25. At an excess of heavy phase in this vessel, the float is raised, whereby the heavier phase can run off through the riser 28. At a deficit of heavy phase, the valve closes in a corresponding manner. Certain advantages are gained with the float valve which must be weighed against the possibility of operation disturbance which this extra component in the system imparts. The float valve constitutes an additional safety factor, since the light phase does not find its way to the outlet for the heavy phase 30 which might possibly happen with a mal-operation, at the start of the column, etc. Further, the level regulation is independent of the hydrostatic pressure in the cleaning circuit.

Forced circulation of the light phase through the cleaning circuit may be effected in such a way that a certain small amount C is sucked out of the riser 27 of the level regulating device, with the help of the pump 39. This flow C is suitably returned to the inlet vessel for the light phase. Instead of the pump 39 an overflow may be used, or a non-return valve and throttle valve—as at 11 and 12 in FIGURE 1—because a certain, albeit inconsiderable pulsing can find its way even to this point in the system.

The circulation of the heavy phase through the cleaning circuit is regulated by means of the inlet flow T at 4 in FIGURE 1 and the outlet flow A at 13. A positive difference, $T-A=D$ is obtained whereby the flow D is drawn off through the cleaning circuit to the outlet 22 (FIGURE 1) or the outlet 30 (FIGURE 2).

FIGURE 1 shows only one cleaning circuit completely, while a second cleaning circuit is imagined to be connected at 34.

It may be mentioned that several cleaning circuits should be arranged parallel so that when necessary one cleaning circuit may be disconnected for decontamination, whereat the liquid flow is drawn off through an alternative cleaning circuit. This can be practically carried out in the following manner, in which it is supposed that the conduit 34 is in communication with a cleaning circuit similar to that at the connection 14. The shown cleaning circuit is shut off by the valve 35. This valve may also act to restrict the flow in the event that the resistance in the filter 16 and in the cleaning circuit itself, is so small that an appreciable pulsation occurs in the cleaning circuit. The water is introduced through the conduit 36 and will force the liquids from the cleaning circuit which go to a treatment for spent nuclear fuel. After this, suitable dissolving liquids are introduced through 22 and drawn off through the connection 36, for example, acid mixtures which are allowed to stream slowly through the cleaning circuit until its filter is cleaned. The system is rinsed with water in the same way, and finally with water in the direction of flow from 36 to 22. The cleaning circuit is now filled with water and may be connected again. The use of two connection tubes 37 and 38 between the filter vessel and the level regulating device is mainly in order to avoid gas locks in the filter vessel. Gas locks can, of course, also be eliminated by means of an airing conduit at the highest level of the filter vessel. The performance of the filter is determined by the solutions used and by the occurring impurities. Generally it is not a question of proper filtering, but the intention is that the dispersed impurities should be caught up and held in the filter. This should therefore have a large surface, but at the same time an insignificant flow resistance and large channels. Packings, consisting of rolled up metal wire cloth or metal wool, as well as glass fibre cloth, are very suitable for this purpose. It is also possible to use exchangeable filters which are removed from the filter vessel with the help of manipulators and are then discarded after use. In the above example a filter is used consisting of a mat woven from acid-proof steel thread which is packed to form a filter.

A similar device is used when applying the invention to a column in which the heavy phase is homogeneous and the transition zone is in the upper end of the column. The method of operation is in principle the same and a more detailed description is therefore unnecessary.

The liquid flow which is led off to the cleaning circuit has a somewhat different character at the connection from the cleaning circuit to the upper and lower ends respectively of the column. If the column carries out a simple extraction of a metal salt from a water solution with the help of an organic, lighter solvent, the flow to the cleaning circuit in FIGURE 1, will contain partly water solution free of metal salt and partly pure organic solvent. In this case, there are no greater problems, the water solution goes into the outflow and the organic solvent is carried back to the feed pot. If the boundary layer is situated in the upper column end, however, both the organic solvent and the water solution will contain the valuable metal salt. In this case, the water solution suitably returns to its own feed pot, while the organic solvent is carried back to its feed point. The organic solvent may be returned to the product vessel, but this is in certain cases less suitable, because the solvent may have become contaminated on passing through the filter vessel.

As examples of liquids which may be subjected to the treatment according to the described process, may be mentioned a nitric acid water solution, for example, a 2-normal, containing, for example ½ g. $Pu^{+4}/1$ and 300 g. $U^{+4}/1$, constituting the continuous phase and photogen containing, for example 30 percent by weight of tributyl phthalate as the dispersed phase. With this treatment the fission products remain in the water solution while $Pu^{+4}$ and $U^{+4}$, thanks to the formation of complex compounds with the tributyl phthalate, dissolve in the photogen.

Although the invention has been described particularly for the case in which the extraction apparatus consists of an extraction column in the form of a pulsed column and the treated solutions contain radio active impurities, it is obvious that the invention can also be applied with advantage to other continuous extraction apparatus and for other solutions.

I claim:

1. In a continuously operating liquid-liquid extraction apparatus adapted to work with a first liquid phase dispersed in a continuous second liquid phase, said phases having different densities and forming a transition zone in said extraction apparatus, and said extraction apparatus having inlet and outlet means for said first liquid phase and said second liquid phase respectively, said outlet means for said first liquid phase and said outlet means for said second liquid phase being positioned at different levels, a horizontal branch conduit connected to said extraction apparatus at a level positioned between said levels of said outlet means for said first liquid phase and said outlet means for said second liquid phase, said branch conduit containing a cleaning means for removing dispersed particles from a liquid mixture of said two liquid phases withdrawn from said extraction apparatus and a regulating means connected to the outlet of said branch conduit, said regulating means comprising a container for containing both of said liquid phases withdrawn from said cleaning means and adapted to provide an interface between said phases at a predetermined position therein, and said regulating means comprising a first outlet from said container positioned above such predetermined position of said interface and a second outlet from said container positioned below such predetermined position of said interface, and means controlling the level of the interface in said container to maintain said interface at the level of the outlet of said branch conduit so as to maintain the level of said transition zone in said extraction apparatus at the level where said branch conduit is connected to said extraction apparatus.

2. Arrangement as claimed in claim 1, in which said cleaning means is an exchangeable filter.

3. In a continuously operating liquid-liquid extraction apparatus adapted to work with a first liquid phase dispersed in a continuous second liquid phase, said phases having different densities and forming a transition zone in said extraction apparatus, and said extraction apparatus having inlet and outlet means for said first liquid phase and said second liquid phase respectively, said outlet means for said first liquid phase and said outlet means for said second liquid phase being positioned at different levels, a branch conduit connected to said extraction apparatus at a level positioned between said levels of said outlet means for said first liquid phase and said outlet means for said second liquid phase, said branch conduit containing a cleaning means for removing dispersed particles from a liquid mixture of said two liquid phases withdrawn from said extraction apparatus and a regulating means connected to the outlet of said branch conduit, said regulating means comprising a container containing both of said liquid phases withdrawn from said cleaning means and an interface between said phases, a first open tube connected to said container above the level of said interface, and a second open tube connected to said container below the level of said interface, said open tubes being provided with overflow outlets above the level of said interface at levels such that when said first liquid phase and said second liquid phase flow off through said overflow outlets said transition zone in said extraction apparatus is positioned at the level where said branch conduit is connected to said extraction apparatus.

4. In a continuously operating liquid-liquid extraction apparatus adapted to work with a first liquid phase dispersed in a continuous second liquid phase, said phases having different densities and forming a transition zone in said extraction apparatus, and said extraction apparatus having inlet and outlet means for said first liquid phase and said second liquid phase respectively, said outlet means for said first liquid phase and said outlet means for said second liquid phase being positioned at different levels, a branch conduit connected to said extraction apparatus at a level positioned between said levels of said outlet means for said first liquid phase and said outlet means for said second liquid phase, said branch conduit containing a cleaning means for removing dispersed particles from a liquid mixture of said two liquid phases withdrawn from said extraction apparatus and a regulating means connected to the outlet of said branch conduit, said regulating means comprising a container containing both of said liquid phases withdrawn from said cleaning means and an interface between said phases, a first outlet from said container positioned above said interface, a second outlet from said container positioned below said interface, and a floating valve and valve seat arrangement positioned at and controlling said second outlet.

5. In a continuously operating liquid-liquid extraction apparatus adapted to work with a first liquid phase dispersed in a continuous second liquid phase, said phases having different densities and forming a transition zone in said extraction apparatus, and said extraction apparatus having inlet and outlet means for said first liquid phase and said second liquid phase respectively, said outlet means for said first liquid phase and said outlet means for said second liquid phase being positioned at different levels, a branch conduit connected to said extraction apparatus at a level positioned between said levels of said outlet means for said first liquid phase and said outlet means for said second liquid phase, said branch conduit containing a cleaning means for removing dispersed particles from a liquid mixture of said two liquid phases withdrawn from said extraction apparatus and a regulating means connected to the outlet of said branch conduit, said regulating means comprising a container containing both of said liquid phases withdrawn from said cleaning means and an interface between said phases, a first open tube connected to said container above the level of said interface, a second open tube connected to said container below the level of said interface, said open tubes being provided with overflow outlets at levels above said interface, and a floating valve and valve seat arrangement positioned within said container where said second open tube is connected to said container for controlling said second tube.

6. In a continuously operating liquid-liquid extraction apparatus adapted to work with a first liquid phase dispersed in a continuous second liquid phase, said phases having different densities and forming a transition zone in said extraction apparatus, and said extraction apparatus having inlet and outlet means for said first liquid phase and said second liquid phase respectively, said outlet means for said first liquid phase and said outlet means for said second liquid phase being positioned at different levels, at least two branch conduits connected to said extraction apparatus at a level positioned between said levels of said outlet means for said first liquid phase and said outlet means for said second liquid phase, each of said branch conduits containing a cleaning means for removing dispersed particles from a liquid mixture of said two liquid phases withdrawn from said extraction apparatus and a regulating means connected to the outlet of said branch conduit, said regulating means comprising a container for containing both of said liquid phases withdrawn from said cleaning means and adapted to provide an interface between said phases at a predetermined position therein, and said regulating means comprising a first outlet from said container positioned above such predetermined level of said interface and a second outlet from said container positioned below such predetermined level of said interface and means controlling the level of said interface in said container so as to maintain the level of said transition zone in said extraction apparatus at the level where said branch conduit is connected to said extraction apparatus.

7. In a continuously operating liquid-liquid extraction apparatus adapted to work with a first liquid phase dispersed in a continuous second liquid phase, said phases having different densities and forming a transition zone in said extraction apparatus, and said extraction apparatus having inlet and outlet means for said first liquid phase and said second liquid phase respectively, said outlet means for said first liquid phase and said outlet means for said second liquid phase being positioned at different levels, at least two branch conduits connected to said extraction apparatus at a level positioned between said levels of said outlet means for said first liquid phase and said outlet means for said second liquid phase, each of said branch conduits containing a cleaning means for removing dispersed particles from a liquid mixture of said two liquid phases withdrawn from said extraction apparatus and a regulating means connected to the outlet of said branch conduit, said regulating means comprising a container containing both of said liquid phases withdrawn from said cleaning means and an interface between said phases, a first open tube connected to said container above the level of said interface, and a second open tube connected to said container below the level of said interface, said open tubes being provided with overflow outlets above the level of said interface at levels such that when said first liquid phase and said second liquid phase flow off through said overflow outlets said transition zone in said extraction apparatus is positioned at the level where said branch conduit is connected to said extraction apparatus.

8. In a continuously operating liquid-liquid extraction apparatus adapted to work with a first liquid phase dispersed in a continuous second liquid phase, said phases having different densities and forming a transition zone in said extraction apparatus, and said extraction apparatus having inlet and outlet means for said first liquid phase and said second liquid phase respectively, said outlet means for said first liquid phase and said outlet means for said second liquid phase being positioned at different levels, at least two branch conduits connected to said extraction apparatus at a level positioned between said levels of said outlet means for said first liquid phase and said outlet means for said second liquid phase, each of said branch conduits containing a cleaning means for removing dispersed particles from a liquid mixture of said two liquid phases withdrawn from said extraction apparatus and a regulating means connected to the outlet of said branch conduit, said regulating means comprising a container containing both of said liquid phases withdrawn from said cleaning means and an interface between said phases, a first outlet from said container positioned above said interface, a second outlet from said container below said interface, and a floating valve and a valve seat arrangement positioned at said second outlet controlling said second outlet.

9. In a continuously operating liquid-liquid extraction apparatus adapted to work with a first liquid phase dispersed in a continuous second liquid phase, said phases having different densities and forming a transition zone in said extraction apparatus, and said extraction apparatus having inlet and outlet means for said first liquid phase and said second liquid phase respectively, said outlet means for said first liquid phase and said outlet means for said second liquid phase being positioned at different levels, at least two branch conduits connected to said extraction apparatus at a level positioned between said levels of said outlet means for said first liquid phase and said outlet means for said second liquid phase, each of said branch conduits containing a cleaning means for removing dispersed particles from a liquid mixture of said two liquid phases withdrawn from said extraction apparatus and a regulating means connected to the outlet of said branch conduit, said regulating means comprising a container containing both of said liquid phases withdrawn from said cleaning means and an interface between said phases, a first open tube connected to said container above the level of said interface, a second open tube connected to said container below the level of said interface, said open tubes being provided with overflow outlets at levels above said interface, and a floating valve and valve seat arrangement positioned within said container where said second open tube is connected to said container controlling said second open tube.

References Cited in the file of this patent

UNITED STATES PATENTS 2,729,549    Reman et al. _____ Jan. 3, 1956
2,776,193    Habicht _____ Jan. 1, 1957

OTHER REFERENCES

Jealous et al.: Chem. Eng. Progress, September 1956, pages 366–370.